A. E. WASHBURN.
ATTACHMENT FOR COMPASSES.
APPLICATION FILED OCT. 26, 1907. RENEWED JUNE 17, 1909.

931,359.

Patented Aug. 17, 1909.

WITNESSES:

INVENTOR
A. E. Washburn
BY
W. J. FitzGerald
Attorneys

UNITED STATES PATENT OFFICE.

ALBERT E. WASHBURN, OF BASTROP, LOUISIANA.

ATTACHMENT FOR COMPASSES.

No. 931,359.  Specification of Letters Patent.  Patented Aug. 17, 1909.

Application filed October 26, 1907, Serial No. 399,319. Renewed June 17, 1909. Serial No. 502,798.

*To all whom it may concern:*

Be it known that I, ALBERT E. WASHBURN, a citizen of the United States, residing at Bastrop, in the parish of Morehouse and State of Louisiana, have invented certain new and useful Improvements in Attachments for Compasses; and I do hereby declare the following to be a full, clear, and exact description of the invention, such as will enable others skilled in the art to which it appertains to make and use the same.

My invention relates to new and useful improvements in attachments for compasses and more particularly to that class adapted to be used for surveying and my object is to provide in conjunction with the usual form of needle, a non-magnetic indicator with a graduated arc, whereby any desired angle corresponding to the known magnetic variation east or west of north, may be readily set off.

Other objects and advantages will be hereinafter referred to and more particularly pointed out in the claims.

Figure 1:
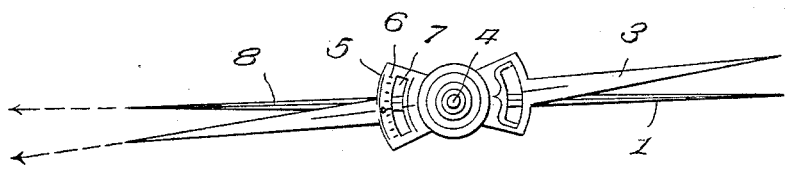
Figure 2:
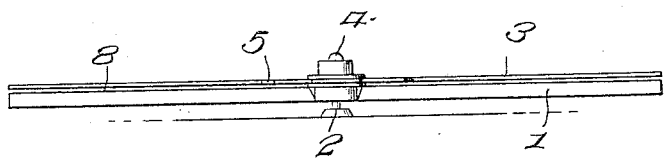
Figure 3:
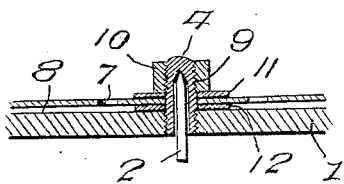

In the accompanying drawings which are made a part of this application, Figure 1 is a top plan view of the usual form of magnetic needle, showing my appliance attached thereto, Fig. 2 is a side elevation thereof, and Fig. 3 is a detail sectional view through the pivotal parts of the needle and attachments therefor.

Referring to the drawings in which similar reference numerals designate corresponding parts throughout the several views, 1 indicates a needle, such as is commonly employed in connection with compasses and surveying instruments, said needle being magnetic, whereby it will be polarized or magnetically attracted. The needle 1 is adapted to freely rotate on the pin 2, so that when the compass-sight is moved to the east or west of north, the needle will indicate the distance of variation to the east or west, said needle being operated by the magnetic attraction. It is a well-known fact, however, that the magnetic north varies from the true north and to instantly compensate for the degree of variation from the true north, I have provided a non-magnetic indicator 3, which is mounted concentric with the needle 1 by placing the same around a jewel crown 4 fixed with the magnetic needle after the same has been properly adjusted.

To instantly indicate the true north from the magnetic north, the indicator 3 is provided with an arc 5, the upper face of which is provided with graduations 6, said graduations extending from the center of the arc, or at zero, to the outer ends of the arc, and to readily set the indicator with respect to the needle 1, a slot 7 is provided in the arc, so that the pointed upper edge 8 of the needle may be readily seen through the slot. In setting the indicator to indicate the true north, the variation of the magnetic north from the true north being known, the indicator 3 is loosened on the crown 4 and the indicator turned thereon until the arc 5 has traveled over the edge 8 of the needle 1 the proper distance, when the indicator is again clamped into engagement with the crown, thereby holding the indicator in its adjusted position and causing the same to operate coincident to the operation of the needle 1. When the indicator is thus set, instead of reading from the magnetic needle 1 and subtracting the known variation of the magnetic north from the true north, the reading is taken from the indicator 3, as said indicator has been previously set to subtract the magnetic north from the true north, thereby giving the exact degree without having to reckon the variation of the magnetic needle. The jewel crown 4 is fixed to the needle 1 in any preferred manner and extends above said needle and through an opening in the needle 3, the upper end of said crown being provided on its exterior surface with threads 9, with which is adapted to engage a bur 10 and by which means the needle 3 is clamped in a fixed position with the needle 1 and to prevent undue wear on the needles, washers 11 and 12 are located above and below the needle 3 and surrounding the crown 4 by which construction it will be readily seen that by loosening the bur or turning the same upwardly on the crown, the needle 3 may be freely rotated and when said needle 3 has been adjusted with respect to the needle 1, the bur 10 is turned downwardly on the crown and the needle 3 clamped in its adjusted position, whereby both needles will be caused to swing in unison on the stem 2.

My object is to provide an indicator of this class, which may be readily attached to the well-known form of needle, or may be expressly manufactured to fit any preferred form of needle and by constructing the attachment of any preferred non-magnetic material, the expense of the needle will be very small and the weight of the whole instrument reduced to a minimum, since a regular vernier compass must be provided with an extra plate or limb, with set screws, etc.

What I claim is:

1. The combination with a magnetic needle, a center pin for said needle and a jewel crown on the needle adapted to engage said pin; of a non-magnetic indicator adjustably secured to said crown, the indicator having means thereon adapted to coöperate with the upper edge of said needle to indicate the variation of the needle from the true north.

2. The combination with a magnetic needle, a center pin for said needle and means to operatively support the needle on said pin; of a nonmagnetic indicator, means to adjustably secure said indicator to the needle, an arc on said needle, said arc being provided with a slot and graduations adapted to coöperate with the upper edge of the needle, whereby the indicator may be instantly set to indicate the variations of the magnetic needle from the true north.

3. The combination with a magnetic needle, a jewel crown on said needle and a pin adapted to engage said crown; of a non-magnetic indicator rotatably mounted on said crown and means engaging the upper end of said crown adapted to lock the nonmagnetic indicator in its adjusted position over the magnetic needle.

In testimony whereof I have signed my name to this specification in the presence of two subscribing witnesses.

ALBERT E. WASHBURN.

Witnesses:
WILLIAM SMITH,
W. M. TAYLOR.